United States Patent
Wallace et al.

(10) Patent No.: US 8,398,730 B2
(45) Date of Patent: Mar. 19, 2013

(54) METHOD AND APPARATUS TO FACILITATE SUBSTITUTE NATURAL GAS PRODUCTION

(75) Inventors: Paul Steven Wallace, Katy, TX (US); Arnaldo Frydman, Houston, TX (US)

(73) Assignee: General Electric Company, Schenectady, NY (US)

( * ) Notice: Subject to any disclaimer, the term of this patent is extended or adjusted under 35 U.S.C. 154(b) by 891 days.

(21) Appl. No.: 12/178,444

(22) Filed: Jul. 23, 2008

(65) Prior Publication Data
US 2010/0018115 A1    Jan. 28, 2010

(51) Int. Cl.
*C10J 1/207* (2006.01)
*B01J 7/00* (2006.01)

(52) U.S. Cl. .............. 48/76; 48/61; 48/127.9; 48/127.1; 48/67; 48/39; 48/206; 48/210; 48/73; 48/77; 48/69; 48/92; 48/111; 48/127.3; 48/197 FM; 48/198; 48/200; 48/100; 48/101; 422/198; 422/200; 110/203; 110/204; 110/214; 110/216

(58) Field of Classification Search ............... 48/76, 77, 48/127.3, 111, 61, 100, 101, 127.9, 197 FM; 110/203, 214, 216
See application file for complete search history.

(56) References Cited

U.S. PATENT DOCUMENTS

| | | | |
|---|---|---|---|
| 4,377,132 A * | 3/1983 | Koog et al. | 122/7 R |
| 4,697,415 A | 10/1987 | Schiffers | |
| 4,841,722 A | 6/1989 | Bjorge | |
| 4,936,871 A * | 6/1990 | Wilmer et al. | 48/197 R |
| 4,946,477 A | 8/1990 | Perka et al. | |
| 5,803,937 A * | 9/1998 | Hartermann et al. | 48/210 |
| 6,032,456 A | 3/2000 | Easom et al. | |
| 6,824,575 B1 | 11/2004 | Otomo et al. | |
| 6,923,004 B2 | 8/2005 | Chandran et al. | |
| 7,272,934 B2 | 9/2007 | Chandran et al. | |
| 7,931,710 B2 * | 4/2011 | Alexander | 48/67 |
| 2007/0137103 A1 * | 6/2007 | Wallace | 48/111 |
| 2007/0186473 A1 * | 8/2007 | Wallace | 48/197 R |
| 2008/0175770 A1 * | 7/2008 | Wallace | 422/201 |

* cited by examiner

*Primary Examiner* — Kaity V. Handal
(74) *Attorney, Agent, or Firm* — Armstrong Teasdale LLP

(57) ABSTRACT

A method of producing substitute natural gas (SNG) includes providing a gasification reactor having a cavity defined at least partially by a first wall. The reactor also includes a first passage defined at least partially by at least a portion of the first wall and a second wall, wherein the first passage is in heat transfer communication with the first wall. The reactor further includes a second passage defined at least partially by at least a portion of the second wall and a third wall. The method also includes coupling the cavity in flow communication with the first and second passages. The method further includes producing a first synthetic gas (syngas) stream within the cavity. The method also includes channeling at least a portion of the first syngas stream to the first and second passages.

14 Claims, 4 Drawing Sheets

ı

METHOD AND APPARATUS TO FACILITATE SUBSTITUTE NATURAL GAS PRODUCTION

BACKGROUND OF THE INVENTION

The present invention relates generally to integrated gasification combined-cycle (IGCC) power generation plants, and more particularly, to methods and apparatus for optimizing substitute natural gas production and heat transfer with a gasification system.

At least some known IGCC plants include a gasification system that is integrated with at least one power-producing turbine system. For example, known gasification systems convert a mixture of fuel, air or oxygen, steam, and/or carbon dioxide ($CO_2$) into a synthetic gas, or "syngas". The syngas is channeled to the combustor of a gas turbine engine, which powers a generator that supplies electrical power to a power grid. Exhaust from at least some known gas turbine engines is supplied to a heat recovery steam generator (HRSG) that generates steam for driving a steam turbine. Power generated by the steam turbine also drives an electrical generator that provides electrical power to the power grid.

Known gasification systems include a gasification reactor within which produces a stream of syngas. The syngas is channeled from the reactor to a plurality of apparatus that remove impurities from the syngas stream, channel at least some of the impurities back into the reactor, quench the syngas stream, and attain predetermined thermodynamic characteristics of the syngas stream. Such apparatus typically require hardware components that include multiple vessels, pumps, heat exchangers, and associated interconnecting piping. Purchasing and installing such hardware increases the capital expenditures of an IGCC plant and increases the risk of plant unavailability. Moreover, because of the increased channeling of the syngas stream through a system that includes such a large number of components, the difficulty of controlling the syngas stream temperatures and pressures is increased. Therefore, methods and/or apparatus that reduce the number of external components and the associated piping are desired.

BRIEF DESCRIPTION OF THE INVENTION

In one aspect, a method of producing substitute natural gas (SNG) is provided. The method includes providing at least one gasification reactor having a cavity in heat transfer communication with a passage. The method also includes coupling the cavity in flow communication with the passage. The method further includes producing a first synthetic gas (syngas) stream within the cavity. The method also includes channeling at least a portion of the first syngas stream to the passage.

In another aspect, a gasification reactor is provided. The reactor includes a cavity defined at least partially by a first wall, wherein the cavity is configured to produce a first synthetic gas (syngas) stream. The reactor also includes a first passage defined at least partially by at least a portion of the first wall and a second wall. The first passage is in heat transfer communication with the first wall. The reactor further includes a second passage defined at least partially by at least a portion of the second wall and a third wall. The second passage is coupled in flow communication with the cavity and the first passage.

In a further aspect, an integrated gasification combined-cycle (IGCC) power generation plant is provided. The IGCC plant includes at least one gas turbine engine coupled in flow communication with at least one gasification system. The at least one gasification system includes at least one gasification reactor that is configured to generate a synthetic gas (syngas). The reactor includes a cavity defined at least partially by a first wall, wherein the cavity is configured to produce a first synthetic gas (syngas) stream. The reactor also includes a first passage defined at least partially by at least a portion of the first wall and a second wall. The first passage is in heat transfer communication with the first wall. The reactor further includes a second passage defined at least partially by at least a portion of the second wall and a third wall. The second passage is coupled in flow communication with the cavity and the first passage.

The method and apparatus for substitute natural gas, or SNG, production as described herein facilitates operation of integrated gasification combined-cycle (IGCC) power generation plants and associated SNG production systems. Specifically, configuring the gasification reactor of an SNG production system to contain at least some of the components normally found outside and downstream of such reactors facilitates reducing hardware procurement and installation, therefore reducing capital and labor costs associated with installing such IGCC plants and SNG production systems as well as reducing associated heat losses.

DETAILED DESCRIPTION OF THE INVENTION

The method and apparatus for substitute natural gas, or SNG, production as described herein facilitates operation of integrated gasification combined-cycle (IGCC) power generation plants and associated SNG production systems. Specifically, configuring the gasification reactor of an SNG production system to contain at least some of the components normally found outside and downstream of such reactors facilitates a reduction of heat losses. More specifically, configuring the IGCC plants and SNG production systems as described herein facilitates optimally generating and collecting heat from the exothermic chemical reactions in the SNG production process to facilitate improving IGCC plant thermal efficiency. Moreover, the method and equipment for producing such SNG as described herein facilitates reducing hardware procurement and installation, therefore reducing capital and labor costs associated with installing such IGCC plants and SNG production systems.

Figure 1:
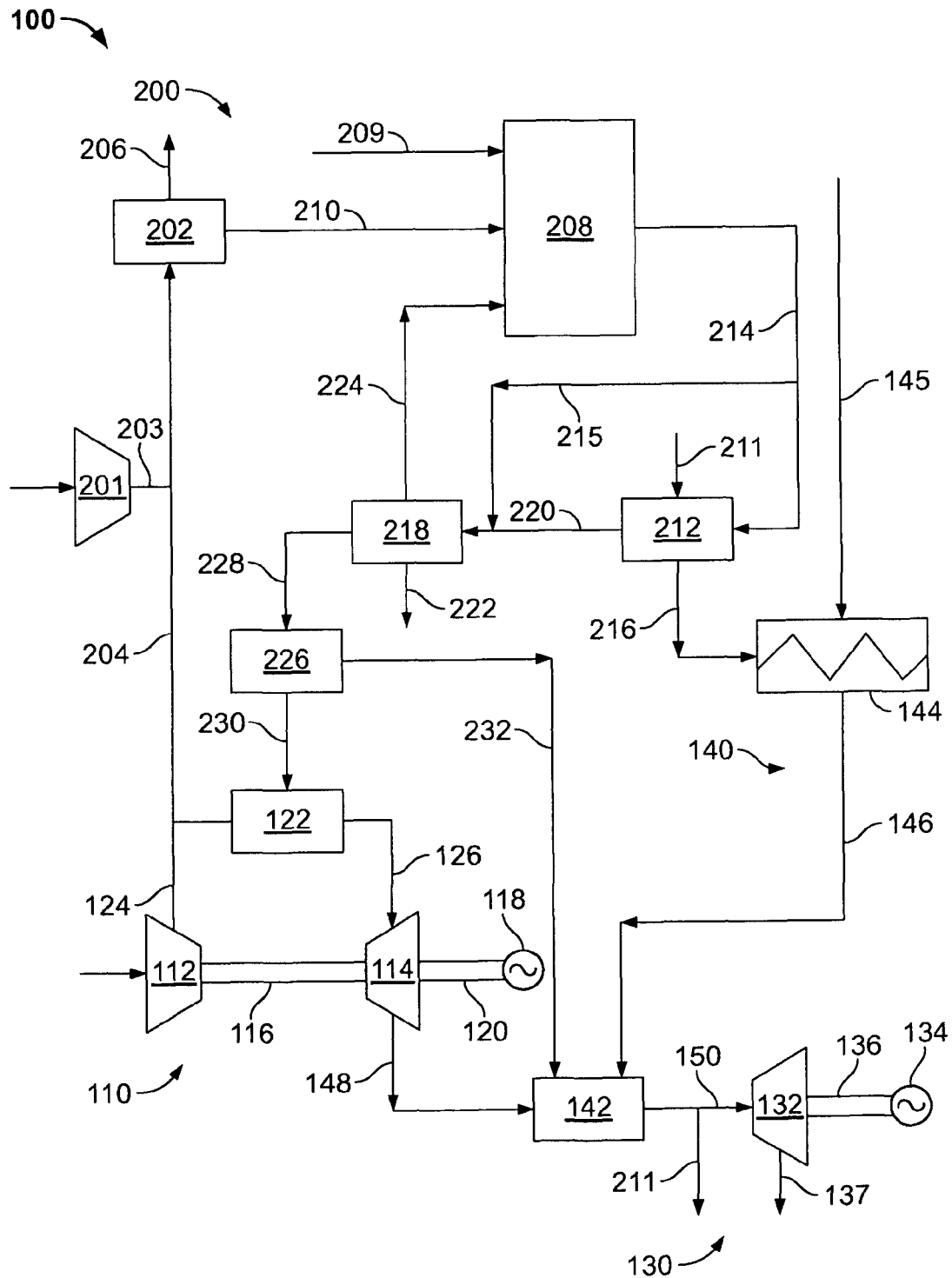
FIG. 1 is a schematic diagram of an exemplary integrated gasification combined-cycle (IGCC) power generation plant.

FIG. 1 is a schematic diagram of an exemplary integrated gasification combined-cycle (IGCC) power generation plant 100. In the exemplary embodiment, IGCC plant includes a gas turbine engine 110. Engine 110 includes a compressor 112 that is rotatably coupled to a turbine 114 via a shaft 116. Compressor 112 receives air at locally atmospheric pressures and temperatures. Turbine 114 is rotatably coupled to a first electrical generator 118 via a first rotor 120. In the exemplary embodiment, engine 110 also includes at least one combustor 122 coupled in flow communication with compressor 112. Combustor 122 receives at least a portion of air (not shown) compressed by compressor 112 via an air conduit 124. Combustor 122 is also coupled in flow communication with at least one fuel source (described in more detail below) and receives fuel from the fuel source. The air and fuel are mixed and combusted within combustor 122 and combustor 122 produces hot combustion gases (not shown). Turbine 114 is coupled in flow communication with combustor 122 and turbine 114 receives the hot combustion gases via a combustion gas conduit 126. Turbine 114 converts the heat energy within the gases to rotational energy. The rotational energy is transmitted to generator 118 via rotor 120, wherein generator 118 converts the rotational energy to electrical energy (not shown) for transmission to at least one load, including, but not limited to, an electrical power grid (not shown).

In the exemplary embodiment, IGCC plant 100 also includes a steam turbine engine 130. More specifically, in the exemplary embodiment, engine 130 includes a steam turbine 132 rotatably coupled to a second electrical generator 134 via a second rotor 136.

IGCC plant 100 also includes a steam generation system 140. In the exemplary embodiment, system 140 includes at least one heat recovery steam generator (HRSG) 142 that is coupled in flow communication with at least one heat transfer apparatus 144 via at least one heated boiler feedwater conduit 146. Apparatus 144 receives boiler feedwater from a conduit 145. HRSG 142 is also coupled in flow communication with turbine 114 via at least one conduit 148. HRSG 142 receives boiler feedwater (not shown) from apparatus 144 via a conduit 146 for facilitating heating the boiler feedwater into steam. HRSG 142 also receives exhaust gases (not shown) from turbine 114 via an exhaust gas conduit 148 to further facilitate heating the boiler feedwater into steam. HRSG 142 is coupled in flow communication with turbine 132 via a steam conduit 150.

Conduit 150 channels steam (not shown) from HRSG 142 to turbine 132. Turbine 132 receives the steam from HRSG 142 and converts the thermal energy in the steam to rotational energy. The rotational energy is transmitted to generator 134 via rotor 136, wherein generator 134 converts the rotational energy to electrical energy (not shown) for transmission to at least one load, including, but not limited to, the electrical power grid. The steam is condensed and returned as boiler feedwater via a condensate conduit 137.

IGCC plant 100 also includes a gasification system 200. In the exemplary embodiment, system 200 includes at least one air separation unit 202 that is coupled in flow communication with compressor 112 via an air conduit 204. Air separation unit is also coupled in flow communication with at least one compressor 201 via an air conduit 203 wherein compressor 201 supplements compressor 112. Alternatively, air separation unit 202 is coupled in flow communication to other air sources that include, but are not limited to, dedicated air compressors and compressed air storage units (neither shown). Unit 202 separates air into oxygen ($O_2$) and other constituents (neither shown) that, in the exemplary embodiment, are released via vent 206.

System 200 includes a gasification reactor 208 that is coupled in flow communication with unit 202 to receive $O_2$ channeled from unit 202 via a conduit 210. Reactor 208 also receives coal 209 to produce a sour synthetic gas (syngas) stream (not shown).

System 200 also includes a gas shift reactor 212 that is coupled in flow communication with reactor 208 and that receives the sour syngas stream from gasification reactor 208 via a conduit 214. Reactor 212 is also coupled in flow communication with steam conduit 150 and receives at least a portion of steam channeled from HRSG 142 via a steam conduit 211. Gas shift reactor 212 produces a shifted sour syngas stream (not shown) that includes carbon dioxide ($CO_2$) and hydrogen ($H_2$) at increased concentrations as compared to the sour syngas stream produced in reactor 208. Reactor 212 is also coupled in heat transfer communication with heat transfer apparatus 144 via heat a transfer conduit 216. Conduit 216 facilitates transferring heat generated within reactor 212 via exothermic chemical reactions associated with shifting the syngas. Apparatus 144 receives at least a portion of the heat generated within reactor 212.

System 200 further includes a shift reactor bypass conduit 215. Conduit 215 is coupled in flow communication with conduits 214 and 220, and channels at least a portion of the sour synthetic gas stream from conduit 214 to conduit 220, wherein at least a portion of the sour synthetic gas stream bypasses gas shift reactor 212 and is mixed with the shifted sour syngas stream exiting reactor 212. Such mixing facilitates controlling a $H_2$-to-carbon monoxide (CO) molar ratio in conduit 220 to a value of approximately 3.0, thereby facilitating subsequent methanation reactions as discussed further below.

System 200 also includes an acid gas removal unit (AGRU) 218 that is coupled in flow communication with reactor 212 and that receives the shifted sour syngas stream from reactor 212 via a conduit 220. AGRU 218 facilitates removal of at least a portion of acid components (not shown) from the sour shifted syngas stream via a conduit 222. AGRU 218 also facilitates removal of at least a portion of the $CO_2$ contained in the sour shifted syngas stream, and produces a sweetened syngas stream (not shown) from at least a portion of the sour syngas stream. AGRU 218 is coupled in flow communication with reactor 208 via a $CO_2$ conduit 224 wherein a stream of $CO_2$ (not shown) is channeled to reactor 208.

System 200 further includes a methanation reactor 226 that is coupled in flow communication with AGRU 218 to receive the sweetened syngas stream from AGRU 218 via a conduit 228. Reactor 226 produces a substitute natural gas (SNG) stream (not shown) from at least a portion of the sweetened syngas stream, wherein the stream includes a $H_2$-to-carbon monoxide (CO) molar ratio value of approximately 3.0, thereby facilitating methanation. Reactor 226 is also coupled in flow communication with combustor 122 wherein the SNG stream is channeled to combustor 122 via a SNG conduit 230. Moreover, reactor 226 is coupled in heat transfer communication with HRSG 142 via a heat transfer conduit 232. Such heat transfer communication facilitates transfer of heat to HRSG 142 that is generated by the sweetened syngas-to-SNG conversion process performed within reactor 226.

In operation, compressor 201 receives atmospheric air, compresses the air, and channels the compressed air to air separation unit 202 via conduits 203 and 204. Unit 202 may also receive air from compressor 112 via conduits 124 and 204. The compressed air is separated into $O_2$ and other constituents that are vented via vent 206. The $O_2$ is channeled to gasification reactor 208 via conduit 210. Reactor 208 receives the $O_2$ via conduit 210, coal 209, and $CO_2$ from AGRU 218 via conduit 224. Reactor 208 produces a sour syngas stream that is channeled to gas shift reactor 212 via conduit 214. Reactor 212 receives steam from HRSG 142 via conduits 150 and 211. The sour syngas stream is used to produce the shifted sour syngas stream via exothermic chemical reactions. The shifted syngas stream includes carbon dioxide $CO_2$ and hydrogen $H_2$ at increased concentrations, as compared to the sour syngas stream produced in reactor 208. The heat from the exothermic reactions is channeled to heat transfer apparatus 144 via conduit 216.

Also, in operation, at least a portion of the sour synthetic gas stream is channeled from conduit 214 to conduit 220 via bypass conduit 215, wherein at least a portion of the sour synthetic gas stream is mixed with the shifted sour syngas stream exiting reactor 212. Such mixing facilitates controlling a $H_2$-to-carbon monoxide (CO) molar ratio within the shifted syngas stream in conduit 220 to a value of approximately 3.0, thereby facilitating subsequent methanation reactions in methanation reactor 226.

Moreover, in operation, the shifted syngas stream is channeled to AGRU 218 via conduit 220 wherein acid constituents are removed via conduit 222, and $CO_2$ is channeled to reactor 208 via conduit 224. In this manner, AGRU 218 produces a sweetened syngas stream that is channeled to methanation reactor 226 via channel 228 wherein the SNG stream is produced from the sweetened syngas stream via exothermic chemical reactions. The heat from the reactions is channeled to HRSG 142 via conduit 232 and the SNG stream is channeled to combustor 122 via conduit 230.

Further, in operation, turbine 114 rotates compressor 112 such that compressor 112 receives and compresses atmospheric air, and channels a portion of the compressed air to unit 202 and a portion to combustor 122. Combustor 122 mixes and combusts the air and SNG, and channels the hot combustion gases to turbine 114. The hot gases induce rotation of turbine 114 which subsequently rotates generator 118 via rotor 120, as well as compressor 112.

At least a portion of the combustion gases are channeled from turbine 114 to HRSG 142 via conduit 148. Also, at least a portion of the heat generated in reactor 226 is channeled to HRSG 142 via conduit 232. Moreover, at least a portion of the heat produced in reactor 212 is channeled to heat transfer apparatus 144. Boiler feedwater is channeled to apparatus 144 via conduit 145 wherein the water receives at least a portion of the heat generated within reactor 212. The warm water is channeled to HRSG 142 via conduit 146 wherein the heat from reactor 226 and exhaust gas conduit 148 boils the water to form steam. The steam is channeled to steam turbine 132 and induces rotation of turbine 132. Turbine 132 rotates second generator 134 via second rotor 136. At least a portion of the steam is channeled to reactor 212 via conduit 211. The steam condensed by turbine 132 is recycled for further use via conduit 137.

Figure 2:
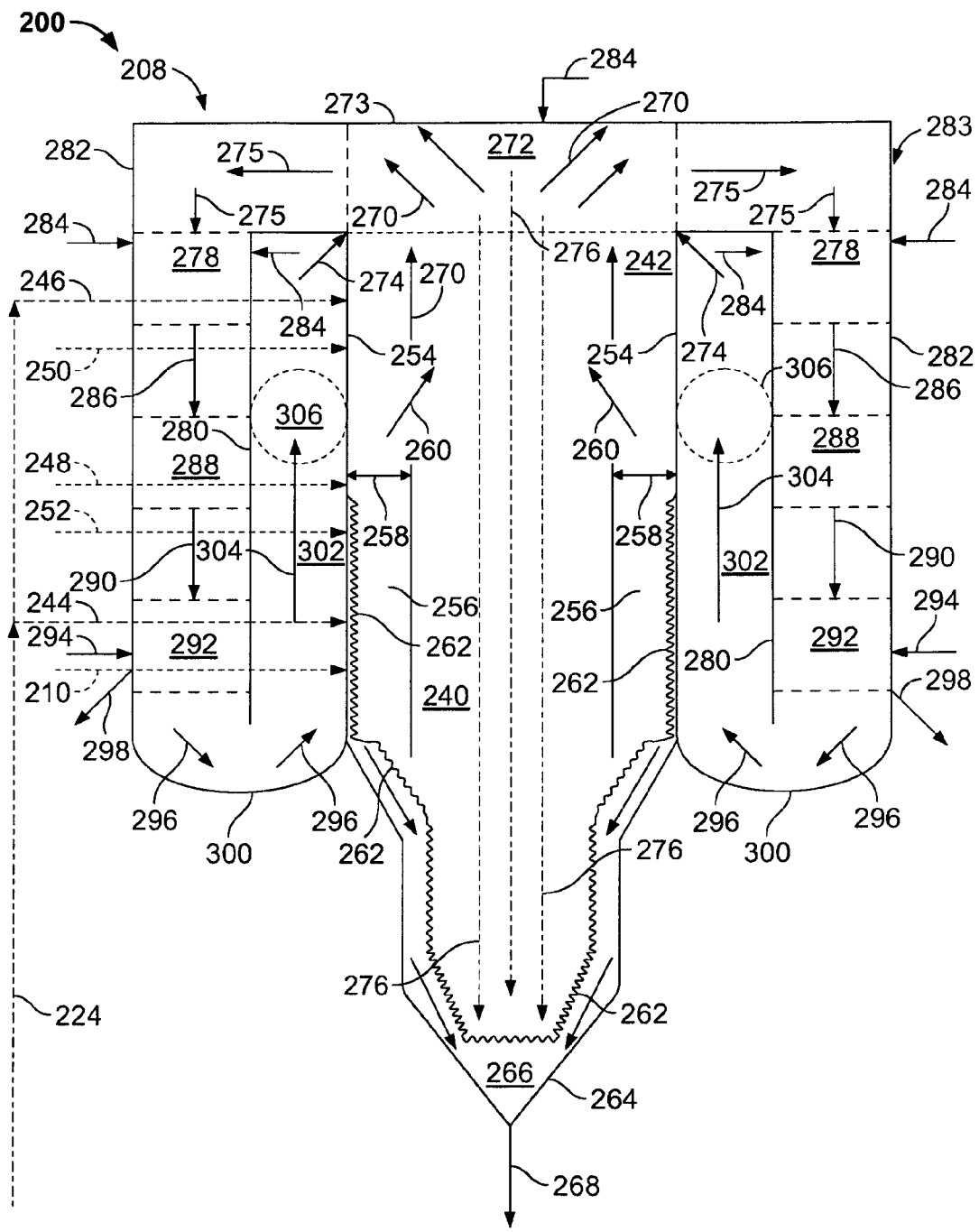
FIG. 2 is a schematic diagram of an exemplary gasification reactor that can be used with the IGCC power generation plant shown in FIG. 1.

FIG. 2 is a schematic diagram of exemplary gasification reactor 208 that can be used with gasification system 200. Reactor 208 includes a first stage 240 and a second stage 242. In the exemplary embodiment, first stage 240 receives $O_2$ via conduit 210 such that lower stage 240 is coupled in flow communication with air separation unit 202 (shown in FIG. 1).

Conduit 224 is coupled in flow communication with a first stage $CO_2$ conduit 244 and a second stage $CO_2$ conduit 246. As such, first stage 240 and second stage 242 are coupled in flow communication to AGRU 218 (shown in FIG. 1). Moreover, first stage 240 and second stage 242 receive dry coal via a lower coal conduit 248 and an upper coal conduit 250, respectively. Furthermore, first stage 240 receives char (not shown) that is collected within other portions of system 200 and is recycled into reactor 208 via a conduit 252.

Reactor 208 includes a first wall 254 that forms at least a portion of first stage 240 and at least a portion of second stage 242 wherein stages 240 and 242 are coupled in flow communication with each other within reactor 208. In the exemplary embodiment, second stage 242 is directly above first stage 240. Alternatively, stages 240 and 242 are coupled in flow communication in any configuration that facilitates operation of reactor 208 as described herein.

Conduits 210, 244, 246, 248, 250 and 252 penetrate wall 254 at predetermined points to facilitate injection of the associated materials and fluids into the associated stages within reactor 208. In the exemplary embodiment, wall 254 is substantially cylindrical. Alternatively, wall 254 has any configuration that facilitates operation of reactor 208 as described herein. Also, in the exemplary embodiment, conduits 210, 244, 246, 248, 250 and 252 are ring-shaped manifolds that facilitate supplying a plurality of openings for each material and fluid wherein only a portion of each is illustrated in FIG. 2. Alternatively, conduits 210, 244, 246, 248, 250 and 252 have any configuration that facilitates operation of reactor 208 as described herein.

In the exemplary embodiment, first stage 240 includes a substantially annular reaction zone 256 that develops between at least a portion of wall 254 and a radial distance 258 radially inward from wall 254. Reaction zone 256 forms during operation of reactor 208 and facilitates receipt of $O_2$, $CO_2$, coal, and char via conduits 210, 244, 248 and 252, respectively. Reaction zone 256 also facilitates at least one chemical reaction between the $O_2$, $CO_2$, coal, and char to form at least a portion of a char-laden, sour, hot synthetic gas (syngas) stream 260 that is channeled into at least a portion of second stage 242 and a molten slag film 262 on at least a portion of wall 254 that is within reaction zone 256. Slag film 262 facilitates formation of syngas stream 260 by receiving at least a portion of the coal and char injected into first stage 240 and collecting such coal and char within slag film 262 to attain a predetermined residence time for the chemical reaction. As additional slag 262 is formed on wall 254, existing slag 262 flows downward against wall 254 due to forces induced by gravity (as illustrated by the associated arrows).

First stage 240 also includes a lock hopper 264 that receives liquid slag 262 as it flows down wall 254. In the exemplary embodiment, hopper 264 is filled with water 266. Alternatively, hopper 264 has any configuration that facilitates operation of system 200 as described herein. Hopper 264 temporarily stores the solidified slag (not shown) that is formed as hot slag 262 received from first stage 240 contacts water 266 and is broken into small solid fragments (not shown). The solidified slag is removed via a conduit 268.

Second stage 242 receives $CO_2$ and coal via conduits 246 and 250, respectively, through wall 254 as well as syngas stream 260 from first stage 240. Stage 242 facilitates chemical reactions between syngas stream 260, the additional coal and $CO_2$ that also form steam, char, methane ($CH_4$) and C2+ (hydrocarbons with two or more carbon atoms) (neither shown) as well as a char-laden, hot, sour syngas stream 270.

Reactor 208 also includes a char recycling and syngas quenching assembly 272. Assembly 272 is at least partially formed by an upper reactor wall 273 that facilitates channeling syngas stream 270. Moreover, assembly 272 receives at least one water stream via a conduit 274 that generates a water spray (not shown) within assembly 272. The water spray impinges, vaporizes into steam, and mixes with syngas stream 270 that is channeled into assembly 272 and facilitates cooling of hot syngas stream 270, such that a cooled, sour, quenched syngas stream 275 is formed. Cooling syngas stream 270 also facilitates agglomeration of the char entrained within syngas stream 270 and the agglomerated char 276 is channeled downward through reactor 208 via gravity into water 266 within hopper 264.

Reactor 208 further includes a nozzle scrubber assembly 278. Assembly 278 is at least partially formed by at least a portion of a second wall 280 and by at least a portion of a third wall 282. Walls 280 and 282 at least partially form an outer substantially annular passage 283 of reactor 208. Assembly 278 is substantially annular and extends within at least a portion of annular passage 283. Quenched syngas stream 275 facilitates cooling wall 282, such that heat released into the immediate vicinity of reactor 208 is reduced.

Assembly 278 receives quenched syngas stream 275 and at least a portion of a substantially solids-free makeup condensate stream (not shown) via a conduit 284. Receiving syngas stream 275 and spraying stream 274 with the condensate stream facilitates further quenching of syngas stream 275 and further agglomeration and removal of char solids (not shown) entrained within stream 275 that were not removed within assembly 272, thereby forming syngas stream 286. Moreover, conduit 284 is positioned such that at least a portion of the substantially solids-free makeup condensate stream is injected into at least a portion of assembly 272 to facilitate cooling at least a portion of the walls therein, including, but not limited to, wall 273. Furthermore, conduit 284 is positioned such that at least a portion of the substantially solids-free makeup condensate stream is injected into at least a portion of assembly 278 to facilitate cooling at least a portion of walls 280 and 282 therein. Moreover, spraying the condensate on walls 273, 280 and 282 also facilitates decreasing an amount of char (not shown) agglomerating on at least a portion of such walls 273, 280 and 282. In the exemplary embodiment, conduit 284 is a ring-shaped manifold that facilitates supplying a plurality of openings for the substantially solids-free makeup condensate stream, however, only a portion of conduit 284 is illustrated in FIG. 2. Alternatively, conduit 284 has any configuration that facilitates operation of reactor 208 as described herein. Syngas stream 286 facilitates cooling wall 282 such that heat released into the immediate vicinity of reactor 208 is reduced.

Reactor 208 also includes a knockout assembly 288. Assembly 288 is at least partially formed by a portion of second wall 280 and by a portion of third wall 282 within passage 283. Assembly 288 is substantially annular and extends within at least a portion of annular passage 283. Assembly 288 receives syngas stream 286 that includes the entrained condensate and agglomerated char solids. In the exemplary embodiment, the agglomerated char solids and condensate are removed from reactor 208 via assembly 288 and additional transport equipment (not shown) for re-injection into assembly 272 via conduit 274, as described above, wherein the agglomerated char is removed from reactor 208 via char stream 276. Alternatively, the agglomerated char solids and condensate are removed from reactor 208 via assembly 288 and are transferred to a disposal facility (not shown). Assembly 288 facilitates forming a quenched, substantially char-free, sour syngas stream 290. Quenched syngas stream 290 facilitates cooling wall 282 such that heat released into the immediate vicinity of reactor 208 is reduced.

Reactor 208 further includes a vane separator assembly 292. Assembly 292 is at least partially formed by a portion of second wall 280 and by a portion of third wall 282. Assembly 292 is substantially annular and extends within at least a portion of annular passage 283. Assembly 292 receives syngas stream 290 and at least a portion of a methanation condensate (not shown) via a conduit 294. Moreover, assembly 292 includes a plurality of vanes (not shown) that abruptly change the direction of syngas stream 290 to facilitate removal of entrained water droplets (not shown) from stream 290 and form a quenched, substantially dry, sour syngas stream 296. The methanation condensate is formed within methanation reactor 226 (shown in FIG. 1) and is channeled to assembly 292. The methanation condensate is injected into assembly 292 to irrigate the vanes such that vane cooling is facilitated. In the exemplary embodiment, conduit 294 is a ring-shaped manifold that facilitates supplying methanation condensate via a plurality of openings, however, only a portion of conduit 294 is illustrated in FIG. 2. Alternatively, conduit 294 has any configuration that facilitates operation of reactor 208 as described herein. The excess methanation condensate and water removed from syngas stream 290 is channeled out of reactor 208 via a conduit 298. In the exemplary embodiment, conduit 298 is a ring-shaped manifold that channels methanation condensate and water from reactor 208 via a plurality of openings, however, only a portion of conduit 298 is illustrated in FIG. 2. Alternatively, conduit 298 has any configuration that facilitates operation of reactor 208 as described herein.

Reactor 208 also includes a wall 300 that at least partially forms passage 283. Wall 300 also partially forms a substantially annular inner passage 302 in cooperation with a portion of walls 254 and 280. Inner passage 302 receives syngas stream 296 wherein syngas stream 296 is substantially thermodynamically saturated, that is, syngas stream 296 is at approximately saturation pressures and temperatures. Wall 300 channels syngas stream 296 from passage 283 to passage 302. A portion of wall 254 facilitates transferring heat from slag 262 into syngas stream 296, thereby facilitating increasing a temperature of syngas stream 296 to superheated temperatures. Therefore, such heat transfer facilitates forming a syngas stream 304 that is at least slightly superheated, that is, heated to a temperature that is at least 5 degrees Celsius (° C.) (10 degrees Fahrenheit (° F.))) above saturation temperature, and facilitates heat removal from first stage 240.

Reactor 208 further includes an expander assembly 306. In the exemplary embodiment, assembly 306 is substantially toroidal and extends within at least a portion of annular passage 302. Alternatively, assembly 306 has any configuration that facilitates operation of reactor 208 as described herein including, but being limited to, a power generation turbine (not shown) wherein the expanding syngas drives the turbine (discussed further below). Assembly 306 receives syngas stream 304 at a predetermined pressure and temperature, wherein the temperature is at least slightly superheated as described above. Expander assembly 306 permits a predetermined value of expansion of syngas stream 304 such that a predetermined exit pressure of a syngas stream (not shown) being channeled from assembly 306 corresponds to a temperature that is at least one of substantially saturated or slightly superheated, that is, heated to a temperature, that is, at most 27° C. (50° F.) above saturation temperature.

An exemplary method of producing substitute natural gas (SNG) includes providing gasification reactor 208 having inner annular passage 302 in heat transfer communication with first stage 240. The method also includes coupling first stage 240 in flow communication with inner annular passage 302. The method further includes producing synthetic gas (syngas) stream 260 within first stage 240. The method also includes channeling at least a portion of syngas stream 260 to inner annular passage 302.

During operation, $O_2$ from separator unit 202, $CO_2$ from AGRU 218 and preheated coal are introduced into first stage 240 via conduits 210, 244 and 248, respectively. In the exemplary embodiment, the coal introduced into first stage 240 is a dry, or low-moisture, coal that is pulverized to a sufficient particle size to permit entrainment of the pulverized coal within syngas stream 260 flowing from first stage 240 to second stage 242. Alternatively, any fuel in any configuration that facilitates operation of reactor 208 as described herein is used. The coal, $CO_2$ and the $O_2$ are reacted with preheated char (collected within other portions of system 200 and is recycled into reactor 208) that is introduced into first stage 240 via conduit 252 to produce syngas stream 260 containing primarily $H_2$, CO, $CO_2$, and at least some hydrogen sulfide ($H_2S$) within reaction zone 256. Such syngas formation is via chemical reactions that are substantially exothermic in nature and the associated heat release generates operational temperatures within a range of approximately 1371° C. (2500° F.) to approximately 1649° C. (3000° F.).

At least some of the chemical reactions that form syngas stream 260 also form slag film 262. The high temperatures within first stage 240 facilitate maintaining a low viscosity for slag 262 such that substantially most of liquid slag 262 is gravity fed into hopper 264 via wall 254 wherein relatively cool water 266 in hopper 264 facilitates rapid quenching and breaking of a solidified slag.

Syngas stream 260 is channeled upward through reactor 208 from first stage 240 into second stage 242. Additional dry, preheated coal and $CO_2$ are introduced into second stage 242 via conduits 250 and 246, respectively, and mix with syngas stream 260. The chemical reactions conducted in second stage 242 are conducted at a temperature in a range of approximately 816° C. (1500° F.) to approximately 982° C. (1800° F.) and at a pressure in excess of approximately 30 bars, or 3000 kiloPascal (kPa) (435 pounds per square inch (psi)) with a sufficient residence time that facilitates the reactants in second stage 242 reacting with the coal. Reactor 208, as described herein, facilitates operation of system 200 at pressures sufficient to facilitate increased syngas production. Moreover, syngas stream 260 with the previously discussed constituents, rises from first stage 240, and the additional coal and $CO_2$ are mixed together to form exothermic chemical reactions that also form steam, char, methane ($CH_4$), and other gaseous hydrocarbons (including C2+, or, hydrocarbon molecules with at least two carbon atoms). The C2+ hydrocarbon molecules and a portion of the $CH_4$ reacts with the steam and $CO_2$ to form hot, char-laden syngas stream 270. The temperature range of second stage 242 is predetermined to facilitate formation of $CH_4$ and mitigate formation of C2+ hydrocarbon molecules.

At least one product of the chemical reactions within second stage 242, i.e., between the preheated coal and the syngas, is a low-sulfur char that is entrained in hot, sour syngas stream 270 containing $CH_4$, $H_2$, CO, $CO_2$, and at least some $H_2S$. The sulfur content of the char is maintained at a minimum level by reacting the pulverized coal with the syngas in the presence of $H_2$ and steam at elevated temperatures and pressures.

Syngas stream 270 is channeled from second stage 242 into char recycling and syngas quenching assembly 272. Assembly 272 receives at least one water stream via conduit 274 that generates a water spray within assembly 272. The water spray impinges, vaporizes into steam, and mixes with syngas stream 270 that is channeled into assembly 272 and facilitates cooling of hot syngas stream 270, such that cooled, sour, quenched syngas stream 275 is formed. The cooling of syngas stream 270 also facilitates agglomeration of the char entrained within syngas stream 270 and the agglomerated char 276 is channeled downward through reactor 208 via gravity into water 266 within hopper 264. Therefore, a substantial portion of the char is separated from syngas stream 270 in assembly 272 and is withdrawn therefrom.

Cooled, sour, quenched syngas stream 275 is channeled to nozzle scrubber assembly 278. Quenched syngas stream 275 facilitates cooling wall 282 such that heat release into the immediate vicinity of reactor 208 is reduced. Assembly 278 receives quenched syngas stream 275 and at least a portion of a substantially solids-free makeup condensate stream via conduit 284. Receiving syngas stream 275 and spraying stream 275 with the condensate stream facilitates further quenching of syngas stream 275 and further agglomeration and removal of char solids (not shown) entrained within stream 275 that were not removed within assembly 272, thereby forming syngas stream 286. Moreover, conduit 284 facilitates channeling at least a portion of the substantially solids-free makeup condensate stream into at least a portion of assembly 272 and into at least a portion of assembly 278 to facilitate cooling at least a portion of the walls therein, including, but not limited to, walls 273, 280 and 282. Spraying the condensate on walls 273, 280 and 282 also facilitates decreasing an amount of char (not shown) agglomerating on at least a portion of such walls 273, 280 and 282. Syngas stream 286 facilitates cooling wall 282 such that heat release into the immediate vicinity of reactor 208 is reduced.

Syngas stream 286 is channeled to knockout assembly 288 wherein assembly 288 receives syngas stream 286 that includes the entrained condensate and agglomerated char solids. In the exemplary embodiment, the agglomerated char solids and condensate are removed from reactor 208 via assembly 288 and additional transport equipment (not shown) for re-injection into assembly 272 via conduit 274 as described above wherein the agglomerated char is removed from reactor 208 via char stream 276. Alternatively, the agglomerated char solids and condensate are removed from reactor 208 via assembly 288 and are transferred to a disposal facility. Assembly 288 facilitates forming a quenched, substantially char-free, sour syngas stream 290. Quenched syngas stream 290 facilitates cooling wall 282 such that heat release into the immediate vicinity of reactor 208 is reduced.

Internally scrubbing the entrained char from syngas streams 270 and 275 via assemblies 272 and 278, respectively, facilitates decreasing heat loss from the associated syngas streams that would otherwise occur if the syngas streams were directed to components outside of reactor 208. Moreover, recycling the char water slurry from assembly 288 into reactor 208 via conduit 274 facilitates mitigating a loss of the heat content within the water/char slurry.

Quenched syngas stream 290 is channeled to vane separator assembly 292 that receives syngas stream 290 and at least a portion of the methanation condensate via conduit 294. The plurality of vanes within assembly 292 abruptly change the direction of syngas stream 290 and facilitate removal of entrained water droplets from stream 290 and form quenched, substantially dry, sour syngas stream 296. The methanation condensate is formed within methanation reactor 226 and is channeled to assembly 292. The methanation condensate is injected into assembly 292 to irrigate the vanes such that vane cooling is facilitated. The excess methanation condensate and water removed from syngas stream 290 is channeled out of reactor 208 via conduit 298.

Syngas stream 296 is channeled into inner passage 302 that receives syngas stream 296 wherein syngas stream 296 is substantially thermodynamically saturated, that is, syngas stream 296 is at approximately saturation pressures and temperatures. At least a portion of wall 254 facilitates transferring heat from slag 262 into syngas stream 296, thereby facilitating increasing a temperature of syngas stream 296 to superheated temperatures. Therefore, such heat transfer facilitates forming a syngas stream 304 that is at least slightly superheated and heat removal from first stage 240 is facilitated. Moreover, transferring heat into syngas stream 304 from slag 262 facilitates extending a length of service life of wall 254. Furthermore, superheating syngas stream 304 increases the energy within stream 304 such that heat transfer within expander assembly 306 is facilitated when assembly 306 is a turbine engine (discussed further below).

Syngas stream 304 is channeled to expander assembly 306 that receives syngas stream 304 at a predetermined pressure and temperature, wherein the temperature is at least slightly superheated, that is, the temperature is at least 5° C. (10° F.) above the saturation temperature for the predetermined pressure. Expander assembly 306 facilitates a predetermined value of expansion of syngas stream 304 such that a predetermined exit pressure of the syngas stream being channeled from assembly 306 corresponds to a temperature that is at least one of substantially saturated or slightly superheated, that is, a temperature that is at most 28° C. (50° F.) above the saturation temperature for the predetermined pressure. The syngas exiting from assembly 306 is channeled to shift reactor 212 for further processing as described above.

Figure 3:
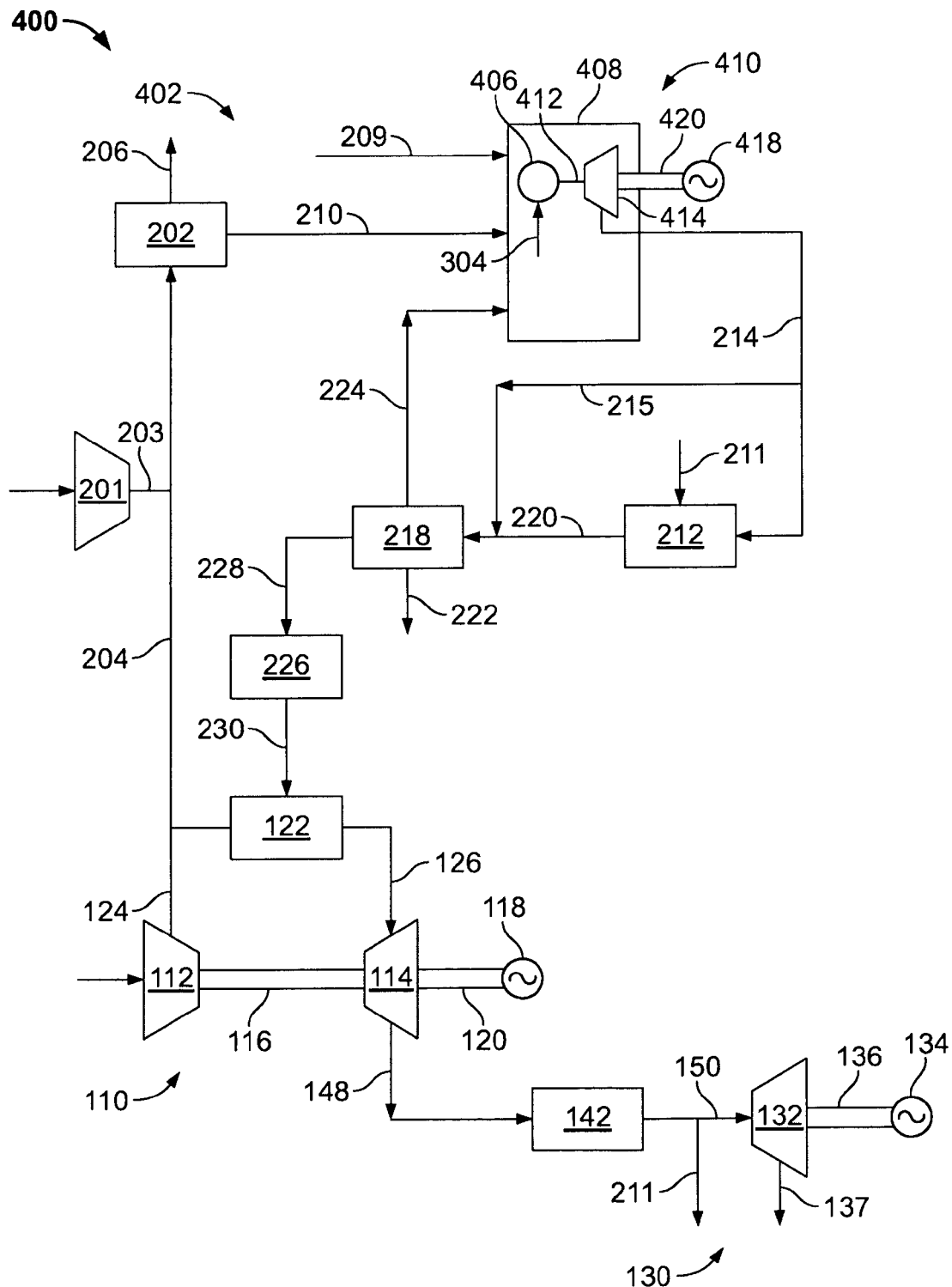
FIG. 3 is a schematic diagram of an alternative IGCC power generation plant.

FIG. 3 is a schematic diagram of an alternative IGCC power generation plant 400. IGCC plant 400 is similar to IGCC plant 100 with the exceptions that IGCC plant 400 includes gasification system 402 and does not include conduits 145, 146, 216 and 232, and heat transfer apparatus 144, all associated with steam generation system 140. Alternative gasification system 402 includes an alternative gasification reactor 408. Reactor 408 is substantially similar to reactor 208 with the exception that an expander assembly in reactor 408 is a turbine 414. In this alternative embodiment, turbine 414 is a component of a turbine engine 410 that also includes an electric power generator 418. Generator 418 is rotatably coupled to turbine 414 via rotor 420. Alternatively, turbine 414 is coupled to any power-driven device such as, but not limited to, pumps, fans and compressors. Turbine 414 is coupled in flow communication with a substantially toroidal syngas collection manifold 406 that is positioned within passage 302 in a manner similar to expander assembly 306 (both shown in FIG. 2) via at least one conduit 412. Manifold 406 receives syngas stream 304. Turbine 414 is coupled in flow communication with shift reactor 212 via conduit 214.

During operation, superheated syngas stream 304 is channeled into manifold 406. Manifold 406 receives the superheated syngas and facilitates channeling the syngas to turbine 414 via conduit 412 at a predetermined pressure and predetermined temperature. As the syngas is channeled through turbine 414 the thermal energy within the syngas is converted to a rotational energy of turbine 414. Turbine 414 rotates generator 418 via rotor 420 wherein generator 418 generates a predetermined amount of electrical power. Syngas (not shown) exhausted from turbine 414 is channeled to shift reactor 212 via conduit 214. Also, in operation, at least a portion of the sour synthetic gas stream is channeled from conduit 214 to conduit 220 via bypass conduit 215, wherein at least a portion of the sour synthetic gas stream is mixed with the shifted sour syngas stream exiting reactor 212. The exhausted syngas channeled to reactor 212 and bypass conduit 215 include a predetermined temperature and pressure such that the syngas is either substantially saturated or slightly superheated, that is, a temperature that is at most 28° C. (50° F.) above the saturation temperature for the predetermined pressure.

This alternative embodiment has the benefit of using the thermal energy within the syngas produced in gasification reactor 408 to drive turbine 414 instead of capturing thermal energy elsewhere downstream of reactor 408. Moreover, such configuration as in IGCC plant 400 facilitates eliminating the piping, pumps, motors, heat transfer apparatus, and other components associated with steam generation system 140. Therefore, the capital costs associated with such components may be reduced and/or eliminated.

Figure 4:
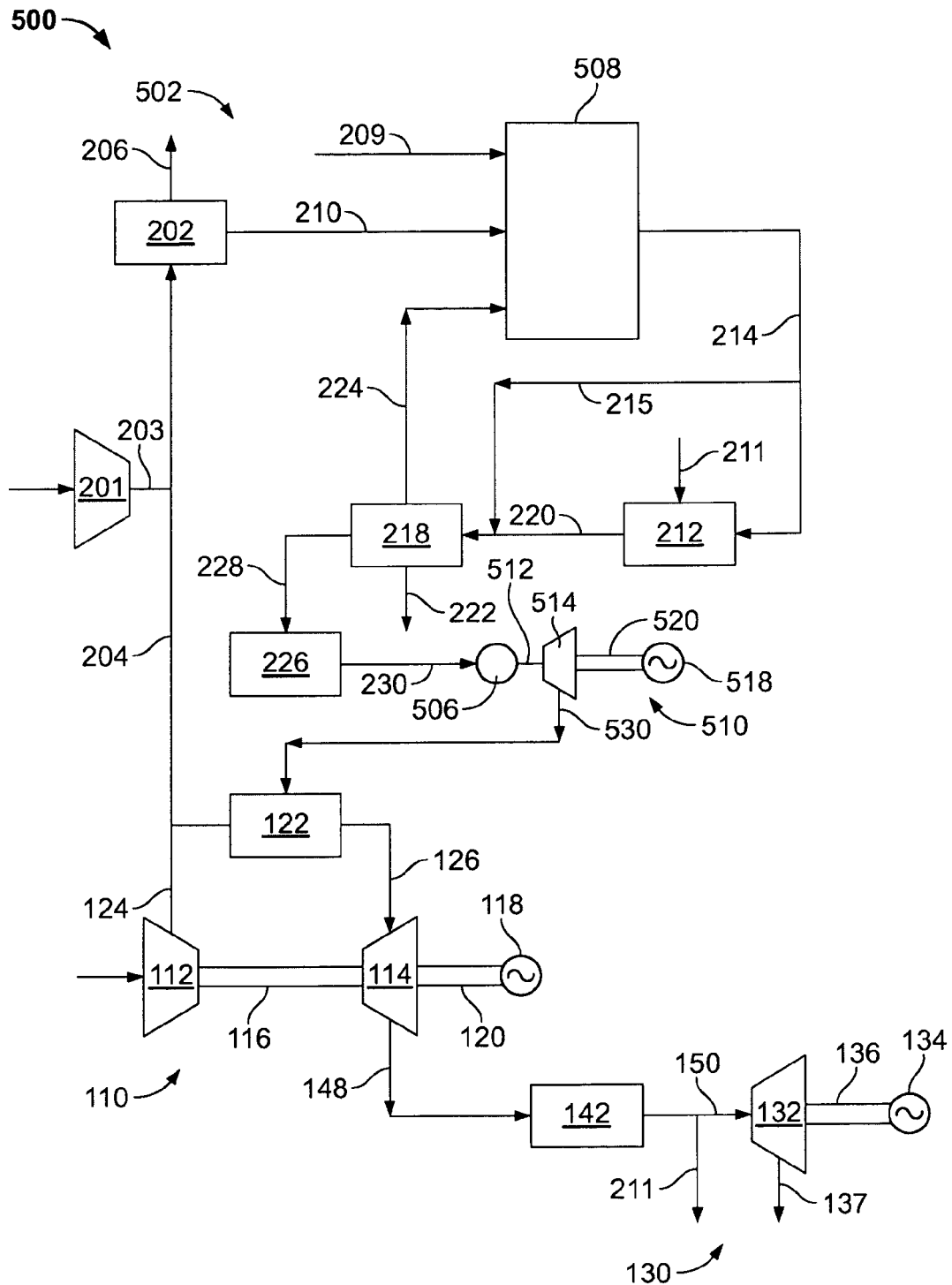
FIG. 4 is a schematic diagram of another alternative IGCC power generation plant.

FIG. 4 is a schematic diagram of another alternative IGCC power generation plant 500. IGCC plant 500 is similar to IGCC plant 400 with the exceptions that IGCC plant 500 includes a gasification system 502. System 502 includes gasification reactor 508 that is substantially similar to reactor 408 (shown in FIG. 3) with the exception that the expander assembly features including turbine engine 410 (shown in FIG. 3) are installed elsewhere within system 502. In this alternative embodiment, a turbine engine 510 is positioned between methanation reactor 226 and combustor 122. Alternatively, turbine engine 510 or any other expansion device is positioned anywhere downstream of gasification reactor 508 that facilitates operation of system 502 and plant 500 as described herein. Specifically, expansion is facilitated by turbine engine 510 that is substantially similar to turbine engine 410 (shown in FIG. 3). In this alternative embodiment, turbine engine 510 includes a turbine 514. An electric power generator 518 is rotatably coupled to turbine 514 via a rotor 520. Alternatively, turbine 514 is coupled to any power-driven device such as, but not limited to, pumps, fans and compressors. Turbine 514 is coupled in flow communication with a substantially toroidal syngas collection manifold 506 via at least one conduit 512. Manifold 506 is coupled in flow communication with methanation reactor 226 via conduit 230. Turbine 514 is coupled in flow communication with combustor 122 via a conduit 530.

During operation, an SNG stream is channeled from methanation reactor 226 into manifold 506 via conduit 230. Manifold 506 receives the SNG stream and facilitates channeling the SNG to turbine 514 via conduit 512 at a predetermined pressure and predetermined temperature. As the SNG is channeled through turbine 514 the thermal energy within the SNG is converted to a rotational energy of turbine 514. Turbine 514 rotates generator 518 via rotor 520 wherein generator 518 generates a predetermined amount of electrical power. SNG (not shown) is exhausted from turbine 514 and is channeled to combustor 122 via conduit 530. The exhausted SNG that is channeled to combustor 122 includes a predetermined temperature and pressure such that combustion of the SNG is facilitated.

This alternative embodiment has the benefit of using the thermal energy within the SNG to drive turbine 514 instead of capturing thermal energy elsewhere downstream of reactor 226. Moreover, such configuration as in IGCC plant 500 facilitates eliminating the piping, pumps, motors, heat transfer apparatus, and other components associated with steam generation system 140. Also, components of system 502 that include, but are not limited to, AGRU 218 may be reduced in size as a result of the lower pressure syngas exiting reactor 508. Therefore, the capital costs associated with such components may be reduced and/or eliminated. Furthermore, this alternative embodiment facilitates more efficient conversion of the sweetened syngas stream entering reactor 226 into SNG exiting reactor 226.

The method and apparatus for substitute natural gas, or SNG, production as described herein facilitates operation of integrated gasification combined-cycle (IGCC) power generation plants and associated SNG production systems. Specifically, configuring the gasification reactor of an SNG production system to contain at least some of the components normally found outside and downstream of such reactors facilitates a reduction of heat losses. More specifically, configuring the IGCC plants and SNG production systems as described herein facilitates optimally generating and collecting heat from the exothermic chemical reactions in the SNG production process to facilitate improving IGCC plant thermal efficiency. Moreover, the method and equipment for producing such SNG as described herein facilitates reducing hardware procurement and installation, therefore reducing capital and labor costs associated with installing such IGCC plants and SNG production systems.

Exemplary embodiments of methods and apparatus for facilitating substitute natural gas production are described above in detail. The methods and systems are not limited to the specific embodiments described herein, but rather, components of systems and apparatus and/or steps of the methods may be utilized independently and separately from other components and/or steps described herein. For example, the methods may also be used in combination with other gasification systems and methods, and are not limited to practice with only the gasification systems as described herein. Rather, the exemplary embodiment can be implemented and utilized in connection with many other gasification applications.

While the invention has been described in terms of various specific embodiments, those skilled in the art will recognize that the invention can be practiced with modification within the spirit and scope of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gasification reactor comprising:
   a first stage that is at least partially formed by a first wall, wherein said first stage comprises a cavity defined at least partially by said first wall, said cavity configured to produce a first synthetic gas (syngas) stream;
   a second stage coupled in flow communication with said first stage, wherein said second stage is directly above said first stage and is at least partially formed by said first wall;
   at least two manifolds coupled to said first wall such that each of said at least two manifolds penetrates through said first wall to facilitate channeling fluid into at least one of said first stage and second stage;
   a first passage defined at least partially by at least a portion of said first wall and a second wall, said first passage is in heat transfer communication with said first wall;
   a second passage defined at least partially by at least a portion of said second wall and a third wall, said second passage is coupled in flow communication with said cavity and said first passage, said second passage radially outward from said first passage, said first passage receives at least a portion of said first syngas stream discharged from said second passage; and
   at least one nozzle scrubber assembly that is at least partially formed within said second passage, said at least one nozzle scrubber is oriented to receive at least a portion of the first syngas stream.

2. A gasification reactor in accordance with claim 1 wherein said first passage is coupled in flow communication with at least one expander assembly configured to receive at least a portion of the first syngas stream, said expander assembly facilitates forming a second syngas stream at a predetermined pressure and a predetermined temperature, at least a portion of the second syngas stream has a temperature that is less than approximately twenty-eight degrees Celsius superheated.

3. A gasification reactor in accordance with claim 2 wherein said at least one expander assembly comprises a turbine engine.

4. A gasification reactor in accordance with claim 1 wherein at least a portion of said cavity is coupled in flow communication with at least a portion of at least one char recycling assembly that is configured to receive at least a portion of said the syngas stream, said at least one char recycling assembly is further configured to remove at least a portion of char from at least a portion of the first syngas stream.

5. A gasification reactor in accordance with claim 1 wherein at least a portion of said second passage is coupled in flow communication with at least a portion of said at least one nozzle scrubber assembly, said at least one nozzle scrubber assembly is further configured to remove at least a portion of char from at least a portion of the first syngas stream.

6. A gasification reactor in accordance with claim 1 wherein at least a portion of said second passage comprises at least a portion of at least one knockout assembly that is configured to receive at least a portion of the first syngas stream, said at least one knockout assembly is further configured to remove at least a portion of char from at least a portion of the first syngas stream.

7. A gasification reactor in accordance with claim 1 wherein at least a portion of said second passage comprises at least a portion of at least one vane separator assembly that is configured to receive at least a portion of the first syngas stream, said at least one vane separator assembly is further configured to remove at least a portion of char from at least a portion of the first syngas stream.

8. An integrated gasification combined-cycle (IGCC) power generation plant comprising at least one gas turbine engine coupled in flow communication with at least one gasification system, said at least one gasification system comprising at least one gasification reactor configured to generate a synthetic gas (syngas), said at least one gasification reactor comprising:
   a first stage that is at least partially formed by a first wall, wherein said first stage comprises a cavity defined at least partially by said first wall, said cavity configured to produce a first synthetic gas (syngas) stream;
   a second stage coupled in flow communication with said first stage, said second stage is directly above said first stage and is at least partially formed by said first wall;
   at least two manifolds coupled to said first wall such that each of said at least two manifolds penetrates through said first wall to facilitate channeling fluid into at least one of said first stage and said second stage;
   a first passage defined at least partially by at least a portion of said first wall and a second wall, said first passage is in heat transfer communication with said first wall;
   a second passage defined at least partially by at least a portion of said second wall and a third wall, said second passage is coupled in flow communication with said cavity and said first passage, said second passage radially outward from said first passage, said first passage receives at least a portion of the first syngas stream discharged from said second passage; and
   at least one nozzle scrubber assembly that is at least partially formed within said second passage, said at least one nozzle scrubber assembly is oriented to receive at least a portion of the first syngas stream.

9. An IGCC power generation plant in accordance with claim 8 wherein said first passage is coupled in flow communication with at least one expander assembly configured to receive at least a portion of the first syrigas stream, said expander assembly facilitates forming a second syngas stream at a predetermined pressure and a predetermined temperature, at least a portion of the second syngas stream has a temperature that is less than approximately twenty-eight degrees Celsius superheated.

10. An IGCC power generation plant in accordance with claim 8 further comprising at least one expander assembly downstream of said at least one gasification reactor, said at least one expander assembly configured to receive at least a portion of a first fluid stream, said expander assembly facilitates forming a second fluid stream at a predetermined pressure and a predetermined temperature, at least a portion of the second fluid stream has a temperature that is less than approximately twenty-eight degrees Celsius superheated.

11. An IGCC power generation plant in accordance with claim 8 wherein at least a portion of said cavity is coupled in flow communication with at least a portion of at least one char recycling assembly that is configured to receive at least a portion of the first syngas stream, said at least one char recycling assembly is further configured to remove at least a portion of char from at least a portion of the first syngas stream.

12. An IGCC power generation plant in accordance with claim 8 wherein at least a portion of said second passage is coupled in flow communication with at least a portion of said at least one nozzle scrubber assembly, said at least one nozzle scrubber assembly is further configured to remove at least a portion of char from at least a portion of the first syngas stream.

13. An IGCC power generation plant in accordance with claim 8 wherein at least a portion of said second passage comprises at least a portion of at least one knockout assembly that is configured to receive at least a portion of the first syngas stream, said at least one knockout assembly is further configured to remove at least a portion of char from at least a portion of the first syngas stream.

14. An IGCC power generation plant in accordance with claim 8 wherein at least a portion of said second passage comprises at least a portion of at least one vane separator assembly that is configured to receive at least a portion of the first syngas stream, said at least one vane separator assembly is further configured to remove at least a portion of char from at least a portion of the first syngas stream.

\* \* \* \* \*